Jan. 16, 1951 A. R. LUCAS Re. 23,330

MOTOR STARTING AND SAFETY SWITCH

Original Filed Sept. 28, 1946

INVENTOR.
Alfred R. Lucas
BY Hauke & Hardesty
ATTORNEYS

Reissued Jan. 16, 1951

Re. 23,330

UNITED STATES PATENT OFFICE 23,330

MOTOR STARTING AND SAFETY SWITCH

Alfred R. Lucas, Galion, Ohio

Original No. 2,475,038, dated July 5, 1949, Serial No. 700,074, September 28, 1946. Application for reissue May 24, 1950, Serial No. 163,980

7 Claims. (Cl. 318—221)

Matter enclosed in heavy brackets [ ] appears in the original patent but forms no part of this reissue specification; matter printed in italics indicates the additions made by reissue The present invention relates to electric switches and more specifically to switches through which current is supplied to motors first to the starting windings and then the running windings.

Among the objects of the invention is a switch provided with means for dividing the initial current between the two motor windings and subsequently breaking the circuit through the starting winding.

Another object is a switch provided with means for breaking the motor circuit under conditions of overload or excessive heating.

Still another object is a switch which automatically restarts the motor when the objectionable condition has been relieved.

Other objects and advantages will readily occur to those skilled in the art upon reference to the following description and the accompanying drawings in which Fig. 1 is a top plan view of the switch elements.

Figure 1:
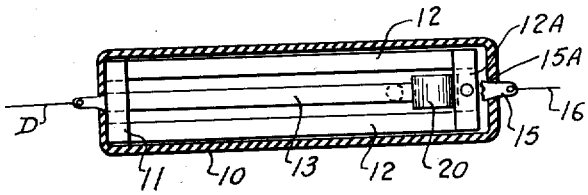

As shown in the drawing, the switch consists of a base or housing 10 of insulating material relatively long and having at one end anchorage means 11 for a pair of spring arms 12, one on each side of but not in contact with, an arm 13 of bi-metal, which extends through and projects from the endwall of the member 10, the projecting end serving as connecting means for a lead wire 14.

The free end of arm 13 carries a contact 13A exposed on both upper and lower faces of the arm, while the arm itself is considerably shorter than the spring arms 12. The spring arms 12 are fixed at their free ends to a conducting cross member 12A which carries a contact 12B exposed on both upper and lower faces of the member 12A.

Located in the end of the base 10 is a short conductor 15 the inner end of which carries a contact 15A in position to coact with the contact 12B and to the outer end of which is connected a lead wire 16.

In the bottom of the base 10 is another fixed contact 17 mounted on a conductor 17A leading from the base or housing and to which is connected a lead wire 18. This contact 17 is below and in position to coact with the contact 13A carried by the bi-metal arm 13. The housing 10 also carries stop members 10A and 10B opposite respectively the contacts 13A and 12B.

Mounted between the free end of arm 13 and the cross member 12A, is a curved flat spring member 20, this being reversely curved at its ends to form sockets and being made of light spring material. Also extending between the same parts is a flexible lead wire 21.

In the use of the switch described above, the lead wire 16 is connected to one end of the running winding A of a motor while the other end of Winding A is connected to one end of the starting winding and at their junction they are connected to a power supply or return line C. The conductor 14 is directly connected to or is a part of the other power lead D. The conductor 18 leads to the other end, or end opposite the running winding, of the starting winding B.

Figure 2:
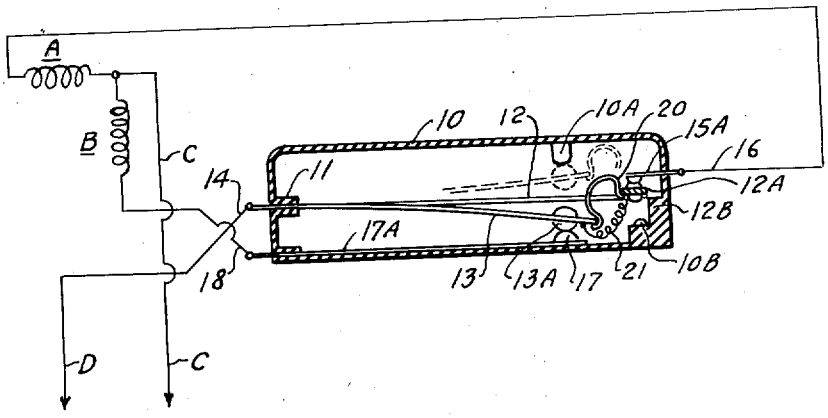
Fig. 2 is a side view thereof and also shows diagrammatically the motor connections.

When the power leads C and D are not energized and no current is flowing through the switch, the parts are in the position shown in full lines in Fig. 2. When the current is turned on, the flow from lead C will be to the bi-metal arm 13 and from this it will be divided and part will go to contact 17 and part through member 20 and flexible lead 21 to contact 15A, so that from lead D the flow of current will be through both the starting winding B and running winding A, all of the current traversing the bi-metal arm 13.

As a consequence, the arm 13 will be heated rather quickly and the contact of 13A with 17 will soon be broken. The time, of course, may readily be pre-set by using the proper strip for arm 13.

With separation of contacts 13A and 17, current flow will continue through contacts 12B, 15A, lead 16 and windings A. The heating effect on arm 13 will be at the same time reduced, so that, under usual running conditions, the arm 13 will not move up sufficiently to break the running circuit.

Figure 4:
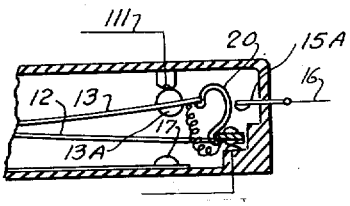
Fig. 4 is a fragmentary section showing the switch of Fig. 3 in open position.

When, however, an overload occurs, and with it an excessive current flow, the arm 13 will move further and cause the toggle spring 20 to snap over center and separate contacts 12B and 15A, as indicated in Fig. 4, and this condition will continue until arm 13 cools sufficiently to move down and cause the toggle spring 20 to again thrust the latter contacts together.

Figure 3:
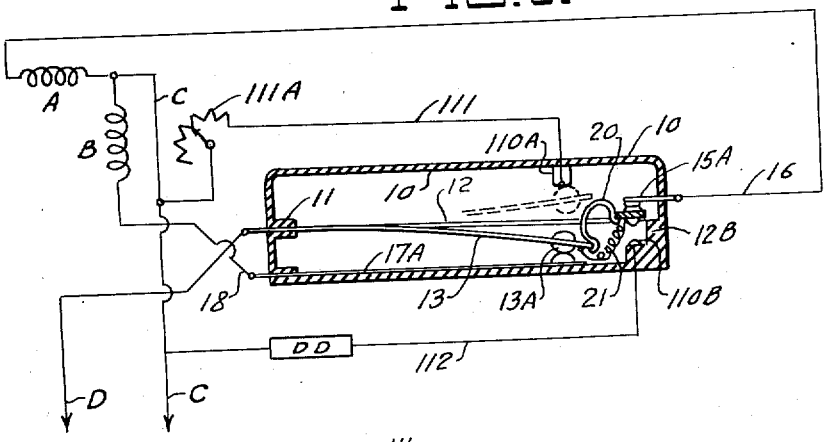
Fig. 3 is a view similar to Fig. 2 but shows in addition, diagrammatically, means for controlling the timing of the re-start.

While it may not be necessary in most cases to delay the re-start for a greater time than that of the natural cooling of arm 13, this time may be [prolounged] *prolonged* by such means as is shown in Fig. 3. In this figure, the stops 10A and 10B are shown as contacts 110A and 110B connected respectively to leads 111 and 112, the former leading to a variable resistance device [11A] *111A* and the latter to any suitable device DD for utilizing the current. This arrangement provides for continuing the current flow through arm 13 when the parts are in the position of Fig. 4 and so continues the heating of the arm. It is of course to be understood that the current flow through leads 111 and 112 will be so regulated that the arm 13 will be allowed to cool at such rate as will produce the time lag desired.

I claim:

1. A motor starting and safety switch consisting of a suitable [enlongated] *elongated* base having adjacent one end thereof a stationary contact adapted to be connected to the running windings of a motor and a second stationary contact adapted to be connected to the starting windings of said motor, a spring arm fixed to the other end of said base and carrying a contact at its free end, adapted to co-act with the first mentioned stationary contact to complete the running circuit, a second arm fixed to said other end of said base and carrying at its free end a contact adapted to co-act with the second stationary contact to complete the starting circuit through said motor, said second arm being connected to a source of current supply and being of bi-metal adapted to flex when heated, said second arm when unheated having its contact in circuit closing relation with the second stationary contact, a flexible conductor fixed to said bi-metal arm and to the contact carried by said spring arm, and a spring toggle member between said bi-metal arm and said spring arm and adapted to move said spring arm and contact away from its co-acting stationary contact when the bi-metal is unduly flexed due to excessive heating.

[2. A motor starting and safety switch consisting of a base member, a spring arm fixed thereto and carrying a contact at its free end, a fixed contact normally touching the first contact, a second conducting arm adapted to flex when heated fixed to said base and arranged in generally parallel relation to the spring arm said second arm having a contact adjacent its free end, a fixed contact which the contact on said second arm touches when cold, a toggle spring cooperating with the free ends of said arms and arranged to press together the contact on said spring arm and its cooperating fixed contact when said second arm is subjected to normal heating and normal flexing and to separate the spring arm contact and its fixed contact when the second arm is subjected to abnormal heating and thereby abnormal flexing.]

[3. An electric switch consisting of an elongated base having fixed at one end thereof a spring arm and a bi-metallic conducting arm generally parallel therewith, means for connecting said bi-metallic arm to a current source, a contact fixed to the free end of each arm, a pair of stationary contacts fixed to said base and adapted to co-act with respective arm carried contacts, and to lie in circuit closing position when cold, said bi-metal arm adapted to flex when heated by passage of current therethrough and thereby separate its contact from its co-acting fixed contact, and a spring toggle member acting between said bi-metal arm and said spring arm and adapted to separate the spring arm carried contact from its co-acting fixed contact when through excessive heating said bi-metal arm is unduly flexed.]

4. A motor control [electric] switch consisting of an elongated base having fixed at one end thereof a spring arm and a bi-metallic conducting arm generally parallel therewith, means for connecting said bi-metallic arm to a current source, a contact fixed to the free end of each arm, a pair of stationary contacts fixed to said base and adapted to co-act with respective arm-carried contacts in circuit closing position when said bi-metal arm is cold, means for connecting the fixed contact co-acting with the spring arm carried contact to the motor, said bi-metal arm adapted to flex when heated by passage of current therethrough and thereby separate its contact from its co-acting fixed contact, a spring toggle member acting between said arms to maintain under normal heating the circuit closed relation of the contact on said spring arm and its co-acting fixed contact and to separate the latter under abnormal heating, a second pair of fixed contacts with which the arm carried contacts are adapted to co-act when said arm has been moved due to excessive heating, at least one of said second pair of fixed contacts being connected in a circuit other than the motor circuit and to thereby increase the cooling time for said bi-metal arm.

*5. A self acting switch for automatically cutting out the starting circuit shortly after an electric motor starts and cutting out both circuits or the running circuit during overload, having in combination spring and thermally sensitive arms fixedly supported each at one end, a spring toggle connecting the other ends of said arms, a pair of swinging contacts supported one on the end of one arm and the other on the end of the other arm where the arms are connected by the said spring toggle, a pair of fixed contacts one opposite and cooperating with each swinging contact, the one set (one movable and one fixed) of contacts arranged to be in circuit with the starting winding of the motor and the other set arranged to be in circuit with the running winding when the arms are not overheated, the thermally sensitive arm being at one time in circuit with the starting winding and the running winding, and after starting, being in circuit only with the running winding and having two states of distortion under heat developed by the passage of current through said arm, one a distortion that separates the contacts controlling the starting winding shortly after motor starting and a second state of distortion wherein the set of contacts that control the running circuit are also separated to stop the motor during overload.*

*6. A self-acting switch for automatically cutting out the starting circuit after starting and for cutting out both circuits or the running circuit of an electric motor during overload, said switch having in combination a base of electric-insulating material, a thermally sensitive arm supported at one end on said base and free to distort at the oher end under influence of the heat generated by passage of current and passing current at all times through the same conductor length and path on said arm, said thermally sensitive member distortable at its free end and movable less than its complete capacity under the combined normal starting and running loads, spring arm means including at least one arm fixedly supported at one end of said housing and free to swing at the other end, spring toggle means connecting the free ends of the thermally sensitive and the spring arms, a pair of contacts, one a fixed one on the base for electrical connection with the starting winding of the motor, the other a contact swung by one of said arms and furnished*

*with current through the full conductor length of said distortable thermally sensitive member, a second pair of contacts one a contact fixed to said base and having a lead for connection with the running winding of the same motor, the other a contact associated with an arm, the thermally sensitive arm operating under the heat generated after a given time by the normal starting and running current to cause a partial distortion to separate the first pair of contacts only and cut out the current to the starting winding lead and operating under excessive load to distort to its limit thereby separating all contacts and breaking the leads to both windings, all arms automatically returning on cooling to normal service positions.*

*7. The combination claimed in claim 6 in which the thermally sensitive arm is a bimetallic arm which swings at its free end under heat changes due to the passage of current or cessation of passage of current.*

*8. The combination claimed in claim 6 in which*

*the arms and spring toggle throw over center with the full distortion of the thermally sensitive arm.*

*9. The combination claimed in claim 6 in which the spring toggle includes a "U" spring strip.*

ALFRED R. LUCAS.

REFERENCES CITED

The following references are of record in the file of this patent or the original patent:

UNITED STATES PATENTS

| Number | Name | Date |
|---|---|---|
| 1,905,823 | Dybvig | Apr. 25, 1933 |
| 2,068,374 | Carlson | Jan. 19, 1937 |
| 2,237,705 | Kohl | Apr. 8, 1941 |
| 2,378,784 | Obszarny | June 19, 1945 |
| 2,414,778 | Tratsch | Jan. 21, 1947 |
| 2,417,912 | Clark | Mar. 25, 1947 |
| 2,505,689 | Rickmeyer | Apr. 25, 1950 |